Nov. 25, 1941. C. J. LE BEL Re. 21,954
ELECTRIC LAMP
Original Filed Aug. 14, 1929 2 Sheets-Sheet 1
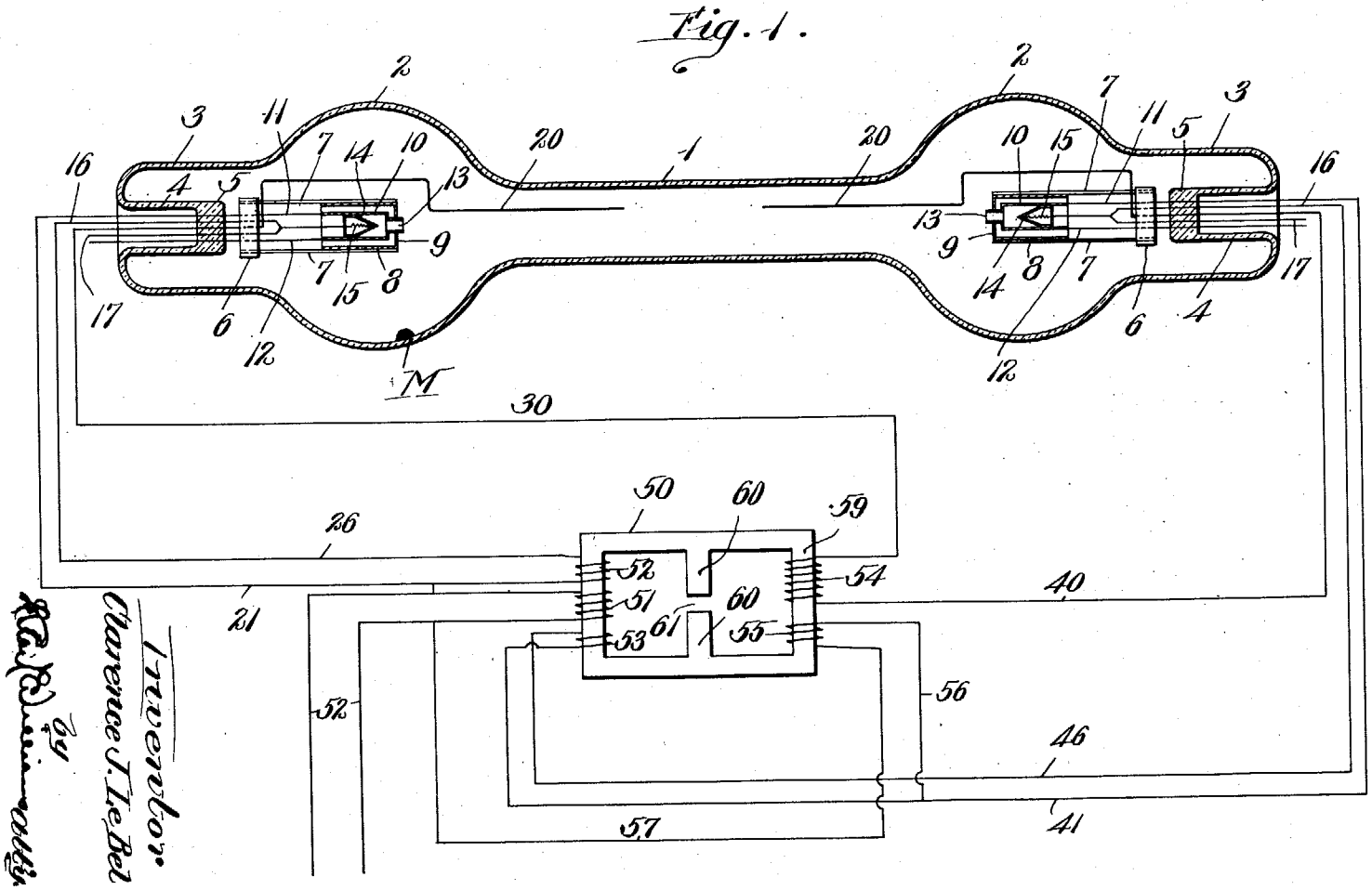

Nov. 25, 1941. C. J. LE BEL Re. 21,954
ELECTRIC LAMP
Original Filed Aug. 14, 1929 2 Sheets-Sheet 2
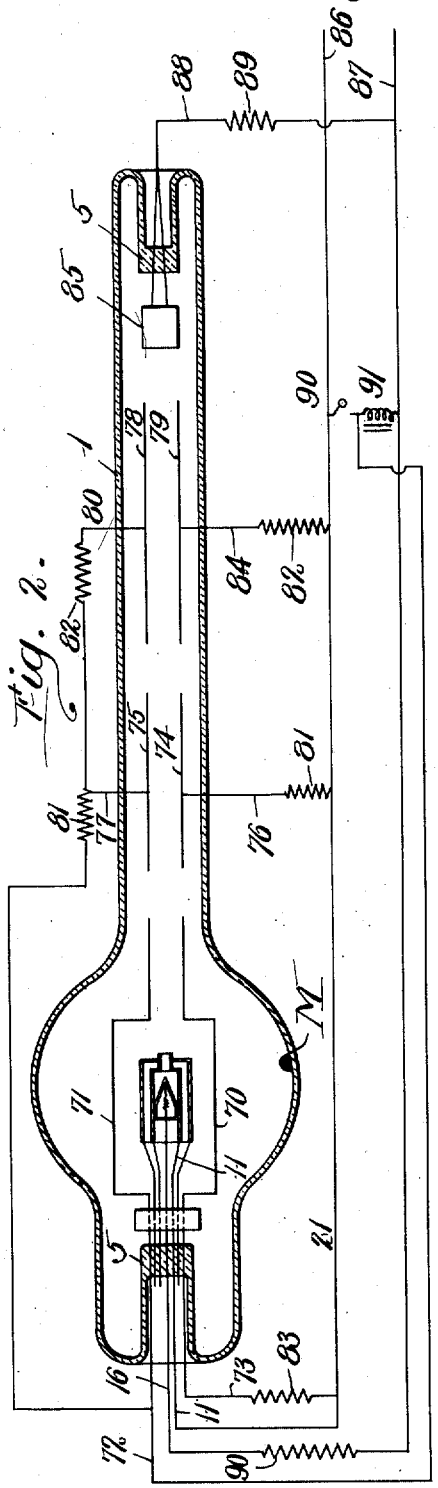
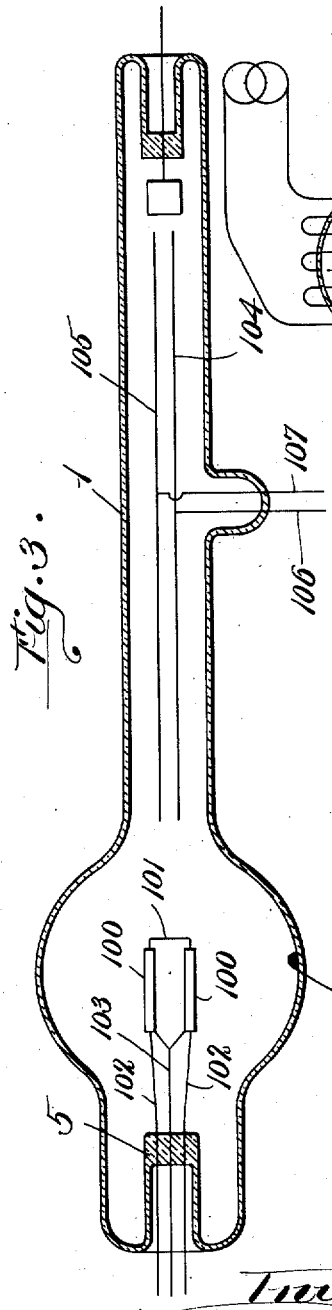
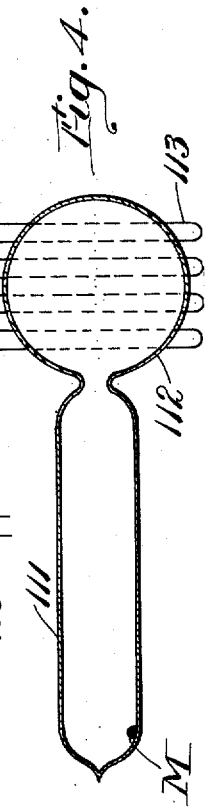
Inventor
Clarence J. Le Bel
by R. Ross Williams
atty.

Reissued Nov. 25, 1941 Re. 21,954

UNITED STATES PATENT OFFICE 21,954

ELECTRIC LAMP

Clarence J. Le Bel, New York, N. Y., assignor, by mesne assignments, to Raytheon Manufacturing Company, Newton, Mass., a corporation of Delaware Original No. 2,126,787, dated August 16, 1938, Serial No. 385,707, August 14, 1929. Application for reissue May 24, 1939, Serial No. 275,549

49 Claims. (Cl. 176—122)

This invention relates to electric lamps and particularly to a lamp which will radiate a substantial portion of its energy in a predetermined portion of the spectrum. The lamp of this invention is characterized by an extraordinary high output of energy lying in the ultra violet portion of the spectrum.

A lamp of this character has great utility in many fields. Thus for sterilizing and antiseptic purposes such a lamp is very efficient. Furthermore many chemical reactions, especially obscure organic reactions such as are involved in the tanning of leather, treating of foods and the like, are greatly accelerated by ultra violet light. For purposes such as these it has been found that only a comparatively narrow portion of the spectrum in the ultra violet region is useful and any of the radiant energy outside of this spectrum is therefore wasted. While devices such as mercury arcs in quartz containers are generators of substantially powerful ultra violet rays, their radiant energy is nevertheless distributed over a considerable spectrum in this region with a resultant loss of efficiency.

An object of this invention is to devise a lamp in which radiant energy in a certain portion of the ultra violet spectrum is generated in a much more efficient manner than has previously been the case. A further object is to devise a lamp which will be simple and cheap and will start and operate at reasonably low voltages.

I have discovered that a metal vapor such as mercury and an inert gas such as argon or neon at certain pressures when carrying a discharge, exhibit a remarkable phenomenon. Under operating conditions the pressure of either one of the rare gases may be between 1 and 8 mm. while the pressure of the mercury preferably should be between 1 and 8 microns. The pressure of the rare gas is not very critical and may be varied over substantially wide limits. It is, however, desirable to maintain the mercury pressure within critical limits. This may be done by either having the necessary amount of cooling surface in the tube or by artificially cooling the tube so that the desired pressure is maintained. Apparently it is immaterial in what manner the gaseous discharge is effected. Thus the discharge through the gas may be effected by one or more thermionic cathodes, one or more cold cathodes in the usual manner or may be effected by inducing high frequency alternating currents in the gas.

Sodium or other easily vaporizable metals may also be used instead of mercury while a comparatively inert gas like nitrogen may be used instead of neon. In general the gas should have a high ionization potential.

When a lamp with such a mixture of gas is energized so that the gas therein becomes ionized, I have discovered that as much as 65% of the total radiant energy is emitted in the form of ultra violet light having a wave length in the case of mercury of about 2537 Angstrom units which is the resonance radiation line of the vapor. By varying the pressure of the mercury within narrow limits this percentage may be reduced somewhat as the energy goes into other wave lengths. Apparently some obscure resonance phenomenon is involved in which rare gas particles freely interact with mercury particles to transfer substantially all energy to the latter and cause it to emit as described. It is possible that some unstable compound of mercury and rare gas is formed which emits its characteristic radiation. The radiation emitted will in general be one of the prominent lines of the substance having the lower ionization potential, in this instance mercury.

By varying the mercury pressure over the wider limits as from 1 to 20 microns, it is possible to ionize both the gas and the vapor and change the color of the resulting light. In fact it is possible to go from the pure color of the gas to the pure color of mercury through the combination of the two colors by properly adjusting the mercury vapor pressure. In this latter case, however, the lamp does not emit as great a portion of its energy in the narrow region of the ultra violet spectrum as is true when the mercury pressure is maintained within smaller limits.

Referring to the drawings,

Figure 1 shows a preferred embodiment of lamp drawn to scale and a circuit for energizing said lamp. The full size cross-sectional diameter of the light-generating cylindrical portion is about one inch.

Figures 2 and 3 are modifications.

Figure 4 shows an induction lamp drawn to scale.

Referring to Figure 1, the lamp consists of a container having a substantially uniform cylindrical portion 1 with rounded spherical portions 2 at each end. Most of the light of this lamp is emitted within the space enclosed by portion 1 of the container. In order to effectively transmit this ultra violet radiant energy, this portion 1 may be made of quartz or a special glass which readily transmits such radiations so that they may be utilized for any desired purpose. Portions 2 may be made of ordinary glass if desired in order to reduce the cost of the lamp. The rounded portions 2 of the lamp terminate in end portions 3 having reentrant portions 4 terminating in presses 5.

Sealed within these presses are a plurality of wires some of which are both supporting wires and leads while others are merely supporting wires. In order to maintain the assembly, insulating members 6 having suitably spaced apertures through which the various leads and supporting wires pass, are disposed beyond the press. Supported by insulators 6 and wires 7 are two hollow cathodes.

While any type of cathode may be used, I prefer to use a thermionic cathode in order to reduce the starting and running potential. A hollow cathode of this type is very efficient and has a long life and is not subject to the destructive bombardment usually present in gas filled tubes. These hollow cathodes comprise outer metal members 8 having a cylindrical shape and end walls 9 with a central aperture therethrough. Within members 8 are cylindrical members 10 supported by wires 11 and 12 respectively. Inner members 10 are cylindrical in shape and at their ends carry smaller cylindrical throat members 13 giving access to the inside of members 10. Within cylindrical members 10 are smaller housings 14 welded or otherwise fastened to the inner surface of members 10. Within these housings are filament heaters 15 grounded to the housing and supported by wires 16 and 17. The inner surface of member 10 between the throat 13 and the housing 14 is preferably coated with suitable chemicals such as the oxide of alkaline earth metals in order to promote electron emission therefrom. Upon the energization of heaters 15 electron emission takes place from the inside surfaces of members 10. During the operation of the tube large quantities of ions are generated in both cathodes and effectively neutralize the electronic space charge. This has a tendency to reduce the cathode drop and greatly increase electron emission therefrom. The lamp is provided with two cathodes, both of which act alternately as anodes when energized by alternating current.

In order to start a lamp of this character, it is necessary to heat either one or both of the cathodes to cause electron emission. Because of the lack of ionization throughout the gas space in the lamp a comparatively high potential in the neighborhood of 700 or 800 volts will be necessary to start a discharge through the tube. As soon as the discharge has started, however, the running potential drops to about 80 volts.

In order to reduce the starting potential and thus eliminate the necessity for complicated apparatus to furnish the high starting potential, I have devised auxiliary ionizing means. These means consist of wires 20 projecting beyond the cathodes and into the space surrounded by portion 1 of the container. By impressing between 150 and 200 volts across the ionizing wires a sufficient amount of ionization in the gas takes place to enable the tube to have a dscharge therethrough. Thus the lamp is a comparatively low voltage lamp inasmuch as the starting voltage is of the order of less than about 200 volts and the operating voltage is still lower.

It is evident that once a discharge has been initiated further discharge between wires 20 is not only unnecessary but may indeed be undesirable. In order to eliminate such a discharge after the tube has been started I preferably have the entire lamp energized by the transformer shown. Due to the reaction of various magnetic fluxes the main discharge through the lamp operates to cut down the ionizing discharge to a negligible value.

Transformer 50 is energized by a primary coil 51 supplied by line wires 52 from any suitable source of alternating current. Mounted on the same leg of the core of the primary is a secondary 52 which energizes one of the heaters 15 through leads 21 and 26. Another secondary 53 similar to 52 and mounted on the same leg energizes the other heater 15 through leads 41 and 46. Ionizing wires 20 are energized through leads 30 and 40 by a secondary 54 on leg 59 of the transformer core. Another coil 55 on the same leg 59 as secondary 54 is connected by leads 56 and 57 across the two cathodes of the lamp. Coil 55 opposes 54 with the result that as soon as the main discharge through the lamp is initiated the current flowing through coil 55 increases the reluctance of leg 59 of the transformer core to such an extent as to drive the magnetic flux through the center leg 60 and airgap 61. Before the main discharge is initiated through the lamp, the reluctance of leg 50 is so low compared to leg 60 that substantially all the flux goes through the former leg. In this way it is evident that substantial discharge between wires 20 is suppressed upon the lamp coming into normal operation.

The lamp shown in Figure 2 is a modification of Figure 1 in which only one cathode is provided and in which the ionizing wires are broken up into suitable lengths. Portion 1 of the container of Figure 2 is preferably the same as Figure 1. The end of the lamp containing the cathode is substantially the same as that shown in Figure 1 with the exception that two ionizing wires 70 and 71 are sealed in press 5 to leads 72 and 73.

If ionizing wires 70 and 71 are too long it has been found that there is a tendency for the discharge to go along these wires, thus reducing the intensity of the gaseous discharge and possibly damaging the ionizing wires. In order to eliminate this I have provided a plurality of distinct ionizing wires connected through resistance to each other to prevent any substantial discharge between the wires. Ionizing wires 74 and 75 are suitably supported by wires 76 and 77 sealed in the lamp. Additional ionizing wires 78 and 79 are similarly supported by wires 80 and 84. Ionizing wires 75 and 78 are connected through suitable resistances 81 and 82 to lead 72.

Ionizing wires 74 and 79 are connected through similar resistances to lead 21 of the cathode. Ionizer wire 70 is connected through a resistance 83 to cathode lead 21. The values of resistances 81, 82 and 83 are preferably so chosen as to prevent any substantial current flowing between the opposing ionizer wires. In this way substantial discharge between them is prevented.

At the other end of the lamp an anode 85 of any suitable material such as carbon or the like is supported by wires sealed in press 5. The lamp is energized by line wires 86 and 87 carrying either direct or alternating current. It is evident that if the current is alternating the lamp will rectify while in operation. The anode and cathode are connected to supply wires 86 and 87 through leads 88, resistance 89 and lead 21. Resistance 89 is of such a value as to keep the current through the lamp at a safe value. In order to energize the heater, lead 16 from the heater is connected through a suitable resistance 90 to line wire 87. Across lines 86 and 87 is disposed a switch 90 and an inductance 91. Lead 72 from ionizing wire 71 is connected between the inner point of the inductance 91 and switch 90. As soon as the cathode has been energized, switch 90 is closed but a short time and then suddenly opened. The resulting high voltage surge across inductance 91 is transmitted through lead 72 to ionizing wires 71, 75 and 78 across the gas space to ionizing wires 70, 74 and 79 through lead 73, resistance 83, cathode lead 11, to inner cathode member 10 then through the heating filament, through lead 16 resistance 90 to the other side of inductance 91.

The tube of Figure 3 is somewhat similar to Figure 2 in that only one cathode is provided. This may consist of two members 100 of porcelain or the like having a metal shell around them being suitably treated for electron emission. Through these members pass heating filaments supported by leads 101. Leads 102 and cathode lead 103 are sealed in press 5 and act to support the entire cathode. Two ionizing wires 104 and 105 are suitably supported by wires 106 and 107 sealed in tube 1. The connections between the anode and cathode and ionizing wires may be similar to that shown in Figure 2.

In Figure 4 is shown in true form, to scale an electrodeless induction lamp comprising a tubular portion 111 and bulb 112. The full size cross-sectional diameter of the light-generating bulb portion 112 is about 1½ inches. Either or both may be made of material transparent to the ultra violet rays generated. A coil 113 energized by a suitable source of high frequency such as an oscillator encircles bulb 113 and energizes the lamp.

After the tubes of Figures 1 to 4 inclusive have thus been constructed they are treated in the customary manner to remove all occluded gases and exhausted to a high vacuum. A small drop of mercury vapor indicated by M may be introduced within the container. In addition, a quantity of argon or neon may be introduced so that at the operating temperature of the tube, the pressure will preferably be within the limits previously specified. As described above, the cross-sectional diameter of the light-generating portion of the container in each case is preferably of the order of magnitude of 1 or 2 inches. When the tube is first started much of the discharge is carried by the rare gas. The discharge, however, warms the mercury so that its pressure becomes sufficient for it to partake of the discharge. Within a very short space of time the lamp begins to function as a generator of ultra violet rays.

For example, in a lamp of which the one shown in Figure 1 is drawn to scale, as explained above and containing neon at about 4 mm. and mercury at about 2 microns, a discharge of two amperes resulted in a very powerful emission of ultra violet in a region of the spectrum below 2900 Angstrom units. A major portion of this energy was concentrated in the 2537 line. During the operation of this lamp the current and pressure within the lamp could be adjusted so that practically the greatest portion of the energy was concentrated in the 2537 line. Thus in practice this concentration of the energy in the 2537 line can be secured by choosing the circuit constants of the circuit into which the lamp is connected so as to relate the intensity of the current or discharge to the surface area so that when the lamp is exposed to the air or surrounding atmosphere with normal ambient temperatures, the temperature rise of the lamp envelope during normal operation maintains the vapor pressure of the mercury within the pressure limits as described herein. From the foreging it will be seen that during operation the container of the lamp is exposed and subjected to the ambient temperature conditions of the air which produce the operation as described above.

I claim:

1. An ultraviolet lamp comprising an envelope, containing mercury vapor at a pressure of between 1 and 8 microns during the normal operation of the lamp, and an inert gas at a pressure of the order of between 1 and 8 mm., and means for producing an electrical discharge in said gaseous filling.

2. A gaseous conduction device including a sealed container containing an ionizable atmosphere, electrodes within said container, a plurality of auxiliary electrodes within said container extending into the region between said first-named electrodes, means for initiating a discharge between said auxiliary electrodes for assisting in the starting of the discharge between said first-named electrodes, and means responsive to the current flowing between said first-named electrodes for suppressing the discharge between said auxiliary electrodes when said current reaches its normal operating value.

3. A gaseous conduction device comprising an elongated tubular container, a thermionic cathode sealed in one end of said container, another electrode adapted to function as an anode sealed at the other end of said container, a gaseous filling in said container, the pressure of said gas being lower than that at which a discharge will start between said cathode and anode upon the application of the operating voltage across said cathode and anode, a plurality of auxiliary electrodes in said container extending into the region between the cathode and anode, said auxiliary electrodes being spaced apart, the spacing between said auxiliary electrodes being sufficiently small to cause an ionizing discharge to occur in the gas between said auxiliary electrodes when a voltage of the order of the operating voltage applied to the tube is applied across said auxiliary electrodes, and means for impressing such voltage across said auxiliary electrodes whereby such an ionizing discharge may be produced to cause a main discharge to start between said cathode and anode.

4. A gaseous conduction device comprising an elongated tubular container, two thermionic cathodes sealed in opposite ends of said container, a gaseous filling in said container, the pressure of said gas being lower than that at which a discharge will start between said electrodes upon the application of the operating voltage across said electrodes, a plurality of auxiliary electrodes in said container extending into the region between the first-mentioned electrodes, the said auxiliary electrodes being spaced apart, the spacing between said auxiliary electrodes being sufficiently small to cause an ionizing discharge to occur in the gas between said auxiliary electrodes when a voltage of the order of the operating voltage applied to the tube is applied across said auxiliary electrodes, and means for impressing such voltage across said auxiliary electrodes whereby such an ionizing discharge may be produced to cause a main discharge to start between said first-mentioned electrodes.

5. A gaseous conduction device comprising an elongated tubular container, a thermionic cathode sealed in one end of said container, another electrode adapted to function as an anode sealed at the other end of said container, a gaseous filling in said container, the pressure of said gas being lower than that at which a discharge will start between said cathode and anode upon the application of the operating voltage across said cathode and anode, and a plurality of pairs of auxiliary electrodes, spaced apart within said tubular container, said discharge path passing between each of said pairs of auxiliary electrodes, one electrode of each of said pairs being connected to one electrode of each of the other of said pairs through a resistance, the other electrode of each of said pairs being connected to the other electrode of each of said pairs through a resistance, the spacing between the electrodes of each of said pairs of auxiliary electrodes being sufficiently small to cause an ionizing discharge to occur in the gas between said auxiliary electrodes when a voltage of the order of the operating voltage applied to the tube is applied across said auxiliary electrodes.

6. An electric discharge lamp device comprising a container, a gaseous atmosphere therein comprising mercury vapor and a rare gas, and means for producing a gaseous electric discharge in said atmosphere, the pressure of the mercury vapor being between one and eight microns and the pressure of the rare gas being between one and eight microns and the pressure of the rare gas being between one and eight millimeters during the operation of the device.

7. The method of operating a gaseous conduction lamp comprising a container with a gaseous filling of mercury vapor, and an inert gas having a pressure of the order of between one and eight millimeters, and means for producing a gaseous electric discharge therein which consists in energizing said lamp and operating the same while maintaining the vapor pressure of said mercury vapor between one and eight microns.

8. The method of operating a gaseous conduction lamp comprising a container, a gaseous filling in said container, said gaseous filling comprising mercury vapor and an inert gas, and means for producing an electrical discharge through said gaseous filling which consists in varying the pressure of the mercury vapor between one and twenty microns, whereby the color emitted by said lamp is varied, the pressure of said inert gas being greater than the pressure of the mercury vapor.

9. A gaseous conduction device including a sealed container containing an ionizable atmosphere, electrodes within said container, a plurality of auxiliary electrodes within said container extending into the region between said first-named electrodes, means for initiating a discharge between said auxiliary electrodes for assisting in the starting of the discharge between said first-named electrodes, said means comprising a transformer having a primary winding and a secondary winding connected to said auxiliary electrodes, and an additional coil on said transformer energized in response to the current flowing between said first-named electrodes, said additional coil opposing said secondary coil, whereby the voltage generated in said secondary coil is reduced to a negligible value when the discharge starts between said first-named electrodes.

10. A gaseous conduction device comprising an elongated tubular container, a thermionic cathode sealed in one end of said container, another electrode adapted to function as an anode sealed at the other end of said container, a gaseous filling in said container, the pressure of said gas being lower than that at which a discharge will start between said cathode and anode upon the application of the operating voltage across said cathode and anode, a plurality of auxiliary electrodes in said container extending into the region between the cathode and anode, the spacing between said auxiliary electrodes being sufficiently small to cause an ionizing discharge to occur in the gas between said auxiliary electrodes when a voltage of the order of the operating voltage applied to the tube is applied across said auxiliary electrodes, whereby an ionizing discharge may be produced to cause a main discharge to start between said cathode and anode, a circuit for impressing a starting voltage to the auxiliary electrodes, and another circuit for impressing an operating voltage between the main electrodes, said two circuits being electrically insulated from each other.

11. An electrical discharge lamp comprising a container, a gaseous atmosphere therein, and means for producing an electrical discharge through said gaseous atmosphere, said gaseous atmosphere comprising mercury and an inert gas, the pressure of the mercury vapor during operation being below eight microns but sufficiently high to become ionized during operation and to emit radiations therefrom, the pressure of the inert gas being at a substantially higher order of magnitude sufficient to permit an ionizing discharge to be initiated therein.

12. An electrical discharge lamp comprising a container, a gaseous atmosphere therein, and means for producing an electrical discharge through said gaseous atmosphere, said gaseous atmosphere comprising mercury and an inert gas, the pressure of the mercury vapor during operation being below eight microns but sufficiently high to produce substantially a maximum of radiation efficiency, the pressure of the inert gas being at a substantially higher order of magnitude sufficient to permit an ionizing discharge to be initiated therein.

13. An electrical discharge lamp comprising a container, a gaseous atmosphere therein, and means for producing an electrical discharge through said gaseous atmosphere, said gaseous atmosphere comprising a metallic vapor and an inert gas, the pressure of the metallic vapor during operation being below eight microns in the path of the discharge but sufficiently high in the path of the discharge to become ionized during operation and to emit radiations therefrom, the pressure of the inert gas being at a substantially higher order of magnitude sufficient to permit an ionizing discharge to be initiated therein.

14. An electrical discharge lamp comprising a container, a gaseous atmosphere therein, and means for producing an electrical discharge through said gaseous atmosphere, said gaseous atmosphere comprising sodium vapor and an inert gas, the pressure of the sodium vapor during operation being below eight microns in the path of the discharge but sufficiently high in the path of the discharge to become ionized during operation and to emit radiations therefrom, the pressure of the inert gas being at a substantially higher order of magnitude sufficient to permit an ionizing discharge to be initiated therein.

15. An electrical discharge lamp comprising a container, a gaseous atmosphere therein, and means for producing an electrical discharge through said gaseous atmosphere, said gaseous atmosphere comprising sodium vapor and an inert gas, the pressure of the sodium vapor during operation being below eight microns in the path of the discharge but sufficiently high to produce substantially a maximum of radiation efficiency, the pressure of the inert gas being at a substantially higher order of magnitude sufficient to permit an ionizing discharge to be initiated therein.

16. A gaseous discharge lamp comprising a container exposed to the air, a gaseous atmosphere therein, and means for producing an electrical discharge through said gaseous atmosphere, said gaseous atmosphere comprising mercury vapor and an inert gas, the intensity of the normal current in said atmosphere being related to the surface of the container to limit the temperature rise of said container above normal ambient temperature to maintain the pressure of said mercury vapor in the range of one to twenty microns, the pressure of said inert gas being of a substantially higher order of magnitude, said lamp being designed and adapted to generate ultra-violet light for utilization.

17. The method of operating a gaseous discharge lamp, designed and adapted to generate ultraviolet light, for utilization, including a container enclosing a gaseous atmosphere comprising mercury vapor and an inert gas which consists in exposing said container to the air, producing an electrical discharge through said gaseous atmosphere and maintaining the intensity of current in said atmosphere as related to the surface of said container at a value to limit the temperature rise of said container above normal ambient temperature to maintain the pressure of said mercury vapor in the range of one to twenty microns, the pressure of said inert gas being at a substantially higher order of magnitude.

18. The method of operating a gaseous discharge lamp, designed and adapted to generate ultraviolet light, for utilization, including a container enclosing a gaseous atmosphere comprising mercury vapor which consists in exposing said container to the air, producing an electrical discharge through said gaseous atmosphere and maintaining the intensity of current in said atmosphere as related to the surface of said container at a value to limit the temperature rise of said container above normal ambient temperature to maintain the pressure of said mercury vapor in the range of one to twenty microns.

19. The method of operating a gaseous discharge lamp, designed and adapted to generate ultraviolet light, for utilization, including a container enclosing a gaseous atmosphere comprising mercury vapor and argon which consists in exposing said container to the air, producing an electrical discharge through said gaseous atmosphere and maintaining the intensity of current in said atmosphere as related to the surface of said container at a value to limit the temperature rise of said container above normal ambient temperature to maintain the pressure of said mercury vapor in the range of one to twenty microns, the pressure of said argon being at a substantially higher order of magnitude.

20. The method of operating a gaseous discharge lamp, designed and adapted to generate ultraviolet light, for utilization, including a container enclosing a gaseous atmosphere comprising mercury vapor and neon which consists in exposing said container to the air, producing an electrical discharge through said gaseous atmosphere and maintaining the intensity of current in said atmosphere as related to the surface of said container at a value to limit the temperature rise of said container above normal ambient temperature to maintain the pressure of said mercury vapor in the range of one to twenty microns, the pressure of said neon being at a substantially higher order of magnitude.

21. A gaseous discharge lamp device comprising a container exposed to the air, a gaseous atmosphere therein, said gaseous atmosphere comprising mercury vapor and an inert gas, means for producing an electrical discharge through said gaseous atmosphere, a circuit for impressing a voltage on said last-named means, the constants of said circuit being at a value to maintain the intensity of the normal current in said atmosphere as related to the surface of said container to limit the temperature rise of said container above normal ambient temperature to maintain the pressure of said mercury vapor in the range of one to twenty microns, the pressure of said inert gas being of a substantially higher order of magnitude, said lamp being designed and adapted to generate ultraviolet light for utilization.

22. A gaseous discharge lamp device comprising a container exposed to the air, a gaseous atmosphere therein, said gaseous atmosphere comprising mercury vapor, means for producing an electrical discharge through said gaseous atmosphere, a circuit for impressing a voltage on said last-named means, the constants of said circuit being of a value to maintain the intensity of the normal current in said atmosphere as related to the surface of said container to limit the temperature rise of said container above normal ambient temperature to maintain the pressure of said mercury vapor in the range of one to twenty microns, said lamp being designed and adapted to generate ultraviolet light for utilization.

23. A gaseous discharge lamp device comprising a container exposed to the air, a gaseous atmosphere therein, said gaseous atmosphere comprising mercury vapor and argon, means for producing an electrical discharge through said gaseous atmosphere, a circuit for impressing a voltage on said last-named means, the constants of said circuit being of a value to maintain the intensity of the normal current in said atmosphere as related to the surface of said container to limit the temperature rise of said container above normal ambient temperature to maintain the pressure of said mercury vapor in the range of one to twenty microns, the pressure of said argon being of a substantially higher order of magnitude, said lamp being designed and adapted to generate ultraviolet light for utilization.

24. A gaseous discharge lamp device comprising a container exposed to the air, a gaseous atmosphere therein, said gaseous atmosphere comprising mercury vapor and neon, means for producing an electrical discharge through said gaseous atmosphere, a circuit for impressing a voltage on said last-named means, the constants of said circuit being of a value to maintain the intensity of the normal current in said atmosphere as related to the surface of said container to limit the temperature rise of said container above normal ambient temperature to maintain the pressure of said mercury vapor in the range of one to twenty microns, the pressure of said neon being of a substantially higher order of magnitude, said lamp being designed and adapted to generate ultraviolet light for utilization.

25. An ultraviolet lamp comprising an envelope exposed to the air, said envelope containing mercury vapor at a pressure of between 1 and 8 microns during the normal operation of the lamp, and an inert gas at a pressure of the order of between 1 and 8 mm. and means for producing an electrical discharge in said gaseous filling, said lamp being designed and adapted to generate for utilization ultraviolet light having a wave length of the order of 2537 Angstrom units.

26. An electric discharge lamp device comprising a container exposed to the air, a gaseous atmosphere therein comprising mercury vapor and a rare gas, and means for producing a gaseous electric discharge in said atmosphere, the pressure of the mercury vapor being between one and eight microns and the pressure of the rare gas being between one and eight millimeters during the operation of the device, said lamp being designed and adapted to generate for utilization ultraviolet light having a wave length of the order of 2537 Angstrom units.

27. The method of operating a gaseous conduction lamp designed and adapted to generate for utilization ultraviolet light having a wave length of the order of 2537 Angstrom units comprising a container exposed to the air with a gaseous filling of mercury vapor, and an inert gas having a pressure of the order of between one and eight millimeters, and means for producing a gaseous electric discharge therein which consists in energizing said lamp and operating the same while maintaining the vapor pressure of said mercury vapor between one and eight microns.

28. An electrical discharge lamp comprising a container exposed to the air, a gaseous atmosphere therein, and means for producing an electrical discharge through said gaseous atmosphere, said gaseous atmosphere comprising mercury vapor and an inert gas, the pressure of the mercury vapor during operation being below eight microns but sufficiently high to become ionized during operation and to emit radiations therefrom, the pressure of the inert gas being at a substantially higher order of magnitude sufficient to permit an ionizing discharge to be initiated therein, said lamp being designed and adapted to generate for utilization ultraviolet light having a wave length of the order of 2537 Angstrom units.

29. An electrical discharge lamp conprising a container exposed to the air, a gaseous atmosphere therein, and means for producing an electrical discharge through said gaseous atmosphere, said gaseous atmosphere comprising mercury and an inert gas, the pressure of the mercury vapor during operation being below eight microns but sufficiently high to produce substantially a maximum of radiation efficiency, the pressure of the inert gas being at a substantially higher order of magnitude sufficient to permit an ionizing discharge to be initiated therein, said lamp being designed and adapted to generate for utilization ultraviolet light having a wave length of the order of 2537 Angstrom units.

30. An electrical discharge lamp comprising a container exposed to the air, a gaseous atmosphere therein, and means for producing an electrical discharge through said gaseous atmosphere, said gaseous atmosphere comprising a metallic vapor and an inert gas, the pressure of the metallic vapor during operation being below eight microns in the path of the discharge but sufficiently high in the path of the discharge to become ionized during operation and to emit radiations therefrom, the pressure of the inert gas being at a substantially higher order of magnitude sufficient to permit an ionizing discharge to be initiated therein, said lamp being designed and adapted to generate for utilization ultraviolet light having a wave length of the order of 2537 Angstrom units.

31. A gaseous discharge lamp device comprising a container exposed to the air, a gaseous atmosphere therein, said gaseous atmosphere comprising mercury vapor and an inert gas, means for producing an electrical discharge through said gaseous atmosphere, said lamp being adapted to be connected into a circuit for impressing a voltage on said last-named means, said lamp also being adapted when so connected to maintain the intensity of the normal current in said atmosphere as related to the surface of said container to limit the temperature rise of said container above normal ambient temperature to maintain the pressure of said mercury vapor in the range of one to twenty microns, the pressure of said inert gas being of a substantially higher order of magnitude, said lamp being designed and adapted to generate ultraviolet light for utilization.

32. A gaseous discharge lamp device comprising a container exposed to the air, a gaseous atmosphere therein, said gaseous atmosphere comprising mercury vapor, means for producing an electrical discharge through said gaseous atmosphere, said lamp being adapted to be connected into a circuit for impressing a voltage on said last-named means, said lamp also being adapted when so connected to maintain the intensity of the normal current in said atmosphere as related to the surface of said container to limit the temperature rise of said container above normal ambient temperature to maintain the pressure of said mercury vapor in the range of one to twenty microns, said lamp being designed and adapted to generate ultraviolet light for utilization.

33. A gaseous discharge lamp device comprising a container exposed to the air, a gaseous atmosphere therein, said gaseous atmosphere comprising mercury vapor and argon, means for producing an electrical discharge through said gaseous atmosphere, said lamp being adapted to be connected into a circuit for impressing a voltage on said last-named means, said lamp also being adapted when so connected to maintain the intensity of the normal current in said atmosphere as related to the surface of said container to limit the temperature rise of said container above normal ambient temperature to maintain the pressure of said mercury vapor in the range of one to twenty microns, the pressure of said argon being of a substantially higher order of magnitude, said lamp being designed and adapted to generate ultraviolet light for utilization.

34. A gaseous discharge lamp device comprising a container exposed to the air, a gaseous atmosphere therein, said gaseous atmosphere comprising mercury vapor and neon, means for producing an electrical discharge through said gaseous atmosphere, said lamp being adapted to be connected into a circuit for impressing a voltage on said last-named means, said lamp also being adapted when so connected to maintain the intensity of the normal current in said atmosphere as related to the surface of said container to limit the temperature rise of said container above normal ambient temperature to maintain the pressure of said mercury vapor in the range of one to twenty microns, the pressure of said neon being of a substantially higher order of magnitude, said lamp being designed and adapted to generate ultraviolet light for utilization.

35. An electrical discharge lamp comprising a container, a gaseous atmosphere therein, and means for producing an electrical discharge through said gaseous atmosphere, said gaseous atmosphere comprising sodium vapor, the pressure of the sodium vapor during operation being below twenty microns in the path of the discharge but sufficiently high in the path of the discharge to become ionized during operation and to emit radiations therefrom.

36. An electrical discharge lamp comprising a container, a gaseous atmosphere therein, and means for producing an electrical discharge through said gaseous atmosphere, said gaseous atmosphere comprising sodium vapor and an inert gas, the pressure of the sodium vapor during operation being below twenty microns in the path of the discharge but sufficiently high in the path of the discharge to become ionized during operation and to emit radiations therefrom, the pressure of the inert gas being at a substantially higher order of magnitude sufficient to permit an ionizing discharge to be initiated therein.

37. An electrical discharge lamp comprising a container, a gaseous atmosphere therein, and means for producing an electrical discharge through said gaseous atmosphere, said gaseous atmosphere comprising sodium vapor and an inert gas, the pressure of the sodium vapor during operation being below twenty microns in the path of the discharge but sufficiently high to produce substantially a maximum of radiation efficiency, the pressure of the inert gas being at a substantially higher order of magnitude sufficient to permit an ionizing discharge to be initiated therein.

38. A gaseous discharge lamp comprising a container exposed to the air, a gaseous atmosphere therein, and means for producing an electrical discharge through said gaseous atmosphere, said gaseous atmosphere comprising metallic vapor and an inert gas, the intensity of the normal current in said atmosphere being related to the surface of the container to limit the temperature rise of said container above normal ambient temperature to maintain the pressure of said metallic vapor in the range of one to twenty microns, the pressure of said inert gas being of a substantially higher order of magnitude, said lamp being designed and adapted to generate the resonance radiation line of said metallic vapor for utilization.

39. A gaseous discharge lamp device comprising a container exposed to the air, a gaseous atmosphere therein, said gaseous atmosphere comprising metallic vapor, means for producing an electrical discharge through said gaseous atmosphere, said lamp being adapted to be connected into a circuit for impressing a voltage on said last-named means, said lamp also being adapted when so connected to maintain the intensity of the normal current in said atmosphere as related to the surface of said container to limit the temperature rise of said container above normal ambient temperature to maintain the pressure of said metallic vapor in the range of one to twenty microns, said lamp being designed and adapted to generate the resonance radiation line of said metallic vapor for utilization.

40. A gaseous discharge lamp device comprising a container exposed to the air, a gaseous atmosphere therein, said gaseous atmosphere comprising metallic vapor and an inert gas, means for producing an electrical discharge through said gaseous atmosphere, said lamp being adapted to be connected into a circuit for impressing a voltage on said last-named means, said lamp also being adapted when so connected to maintain the intensity of the normal current in said atmosphere as related to the surface of said container to limit the temperature rise of said container above normal ambient temperature to maintain the pressure of said metallic vapor in the range of one to twenty microns, the pressure of said inert gas being of a substantially higher order of magnitude, said lamp being designed and adapted to generate the resonance radiation line of said metallic vapor for utilization.

41. A gaseous discharge lamp comprising a container, a gaseous atmosphere therein, and means for producing an electrical discharge through said gaseous atmosphere within a portion of said container in which light is to be generated, the cross-sectional diameter of said portion being of the order of magnitude of one or two inches, said gaseous atmosphere comprising mercury vapor and an inert gas, the pressure of said mercury vapor during normal operation being of the order of magnitude of one to twenty microns, the pressure of said inert gas being of a higher order of magnitude, said lamp being designed and adapted to generate ultraviolet light for utilization.

42. A gaseous discharge lamp comprising a container, a gaseous atmosphere therein, and means for producing an electrical discharge through said gaseous atmosphere within a portion of said container in which light is to be generated, the cross-sectional diameter of said portion being of the order of magnitude of one or two inches, said gaseous atmosphere comprising mercury vapor, the pressure of said mercury vapor during normal operation being of the order of magnitude of one to twenty microns, said lamp being designed and adapted to generate ultraviolet light for utilization.

43. A gaseous discharge lamp comprising a container exposed and subjected to the ambient temperature conditions of the surrounding atmosphere, a gaseous atmosphere therein, and means for producing an electrical discharge through said gaseous atmosphere, said gaseous atmosphere comprising mercury vapor and an inert gas, the intensity of the normal current in said atmosphere being related to the surface of the container to limit the temperature rise of said container above normal ambient temperature to maintain the pressure of said mercury vapor in the range of one to twenty microns, the pressure of said inert gas being of a higher order of magnitude, said lamp being designed and adapted to generate ultraviolet light for utilization.

44. A gaseous discharge lamp comprising a container exposed and subjected to the ambient temperature conditions of the surrounding atmosphere, a gaseous atmosphere therein, and means for producing an electrical discharge through said gaseous atmosphere, said gaseous atmosphere comprising mercury vapor, the intensity of the normal current in said atmosphere being related to the surface of the container to limit the temperature rise of said container above normal ambient temperature to maintain the pressure of said mercury vapor in the range of one to twenty microns, said lamp being designed and adapted to generate ultraviolet light for utilization.

45. In a device for producing ultra-violet radiations having a high intensity in the wave band of 2000 to 2540 Angstrom units, an envelope containing a gaseous filling including mercury vapor and an inert gas, and means for impressing an energizing potential across said device sufficient to cause luminescence of said gaseous filling at a temperature at which the device may be readily handled with a resultant low mercury vapor pressure during operation of said device.

46. An ultra-violet lamp for producing ultraviolet radiations having a high intensity in the wave band of 2000 to 2540 Angstrom units comprising an envelope containing a gaseous filling including mercury vapor and an inert gas, and means for impressing an energizing potential across said lamp at a current consumption sufficient to cause luminescence of said gaseous filling and to maintain the operating temperature of the lamp cool enough to be readily handled whereby a low mercury vapor pressure results during operation of said lamp.

47. An ultra-violet lamp for producing ultraviolet radiations having a high intensity in the wave band of 2000 to 2540 Angstrom units comprising an envelope containing a gaseous filling including mercury vapor and an inert gas, and means for impressing an energizing potential across said lamp at a sufficiently low current consumption to cause luminescence of said gaseous filling with an attendant operating temperature of said lamp low enough to enable it to be readily handled and to limit the pressure of the mercury vapor to a value where no substantial reabsorption of the rays occurs.

48. A low voltage electric discharge lamp device comprising a container exposed to the air, a gaseous atmosphere therein comprising mercury vapor and a rare gas, and means including a thermionic cathode comprising a metal body associated with a material of higher electron emissivity and a cooperating electrode for producing a gaseous electric discharge in said atmosphere, the pressure of the mercury vapor being between one and eight microns and the pressure of the rare gas being between one and eight millimeters during operation of the device, said lamp being designed and adapted to generate for utilization ultraviolet light having a wave length of the order of 2537 Angstrom units.

49. A low voltage gaseous discharge lamp comprising a container exposed to the air, a gaseous atmosphere therein, and means including a thermionic cathode comprising a metal body associated with a material of higher electron emissivity and a cooperating electrode for producing an electrical discharge through said gaseous atmosphere, said gaseous atmosphere comprising mercury vapor and an inert gas, the intensity of the normal current in said atmosphere being related to the surface of the container to limit the temperature rise of said container above normal ambient temperature to maintain the pressure of said mercury vapor in the range of one to twenty microns, the pressure of said inert gas being of a substantially higher order of magnitude, said lamp being designed and adapted to generate ultraviolet light for utilization.

CLARENCE J. LE BEL.